US012666382B2

(12) United States Patent
Hong

(10) Patent No.: US 12,666,382 B2
(45) Date of Patent: Jun. 23, 2026

(54) METHOD AND APPARATUS FOR TRANSMITTING CAPABILITY INDICATION INFORMATION, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/290,227

(22) PCT Filed: May 10, 2021

(86) PCT No.: PCT/CN2021/092843
§ 371 (c)(1),
(2) Date: Nov. 10, 2023

(87) PCT Pub. No.: WO2022/236602
PCT Pub. Date: Nov. 17, 2022

(65) Prior Publication Data
US 2024/0244557 A1     Jul. 18, 2024

(51) Int. Cl.
| *H04W 8/04* | (2009.01) |
| *H04W 8/24* | (2009.01) |
| *H04W 8/26* | (2009.01) |
| *H04W 12/06* | (2021.01) |
| *H04W 60/00* | (2009.01) |
| *H04W 60/04* | (2009.01) |

(52) U.S. Cl.
CPC ............. *H04W 60/00* (2013.01); *H04W 8/24* (2013.01)

(58) Field of Classification Search
CPC ....... H04W 8/24; H04W 60/00; H04W 48/16; H04W 60/04
USPC ........................................................ 455/435.1
See application file for complete search history.

(56) References Cited

U.S. PATENT DOCUMENTS

| 2020/0329422 A1 | 10/2020 | Sirotkin et al. | |
| 2021/0058784 A1 | 2/2021 | Kedalagudde et al. | |
| 2022/0240210 A1* | 7/2022 | Lai ......................... | H04W 12/06 |
| 2022/0330022 A1* | 10/2022 | Kolekar ................ | H04W 12/71 |
| 2023/0099786 A1* | 3/2023 | Xiang ................... | H04W 12/75 |
| | | | 370/329 |
| 2023/0171603 A1* | 6/2023 | Garcia Martin ...... | H04W 12/06 |
| | | | 455/410 |

(Continued)

OTHER PUBLICATIONS

IP.com search History (Year: 2025).*

(Continued)

*Primary Examiner* — Moustapha Diaby
(74) *Attorney, Agent, or Firm* — Arch & Lake LLP; Hao Tan; Shen Wang

(57) ABSTRACT

The embodiments of the present disclosure provide a method for transmitting capability indication information. The method is executed by a network device, and the method comprises: sending, to a terminal, a feedback message for the terminal to initiate network registration; the feedback message carries capability indication information; and the capability indication information is used to indicate that a network supports performing remote subscription data delivery by means of a user plane and/or a control plane.

16 Claims, 6 Drawing Sheets

(56) References Cited

U.S. PATENT DOCUMENTS

2024/0224163 A1* 7/2024 Starsinic .............. H04W 60/04

OTHER PUBLICATIONS

Vivo ("K1#4: conclusions update for CP and UP remote provision-ing", SA WG2 Meeting #143E (e-meeting, 2-2100419, Feb. 24, 2021, (6p)) (see IDS) (Year: 2021).*

International Search Report of PCT/CN2021/092843 dated Jan. 5, 2022 with English translation, (4p).

Vivo, "K1#4: conclusions update for CP and UP remote provision-ing", SA WG2 Meeting #143E (e-meeting, S2-2100419, Feb. 24, 2021, (6p).

Vivo, "T2-C: Configuration for UP remote provisioning for O-SNPN", SA WG2 Meeting #143E (e-meeting), S2-2100422, Feb. 24, 2021, (38p).

3GPP TR 23.754, V17.1.0 (Mar. 2021) Technical Report, 3rd Generation Partnership Project; Technical Specification Group Services and System Aspects; Study on supporting Unmanned Aerial Systems (UAS) connectivity, Identification and tracking (Release 17) (139p).

3GPP TS 23.501 V18.3.0 (Sep. 2023), Technical Specification, 3rd Generation Partnership Project; Technical Specification Group Services and System Aspects; System architecture for the 5G System (5GS); Stage 2, (Release 18), (686p).

3GPP TS 23.502 V18.3.0 (Sep. 2023) Technical Specification, 3rd Generation Partnership Project; Technical Specification Group Services and System Aspects; Procedures for the 5G System (5GS); Stage 2 (Release 18), (889p).

* cited by examiner

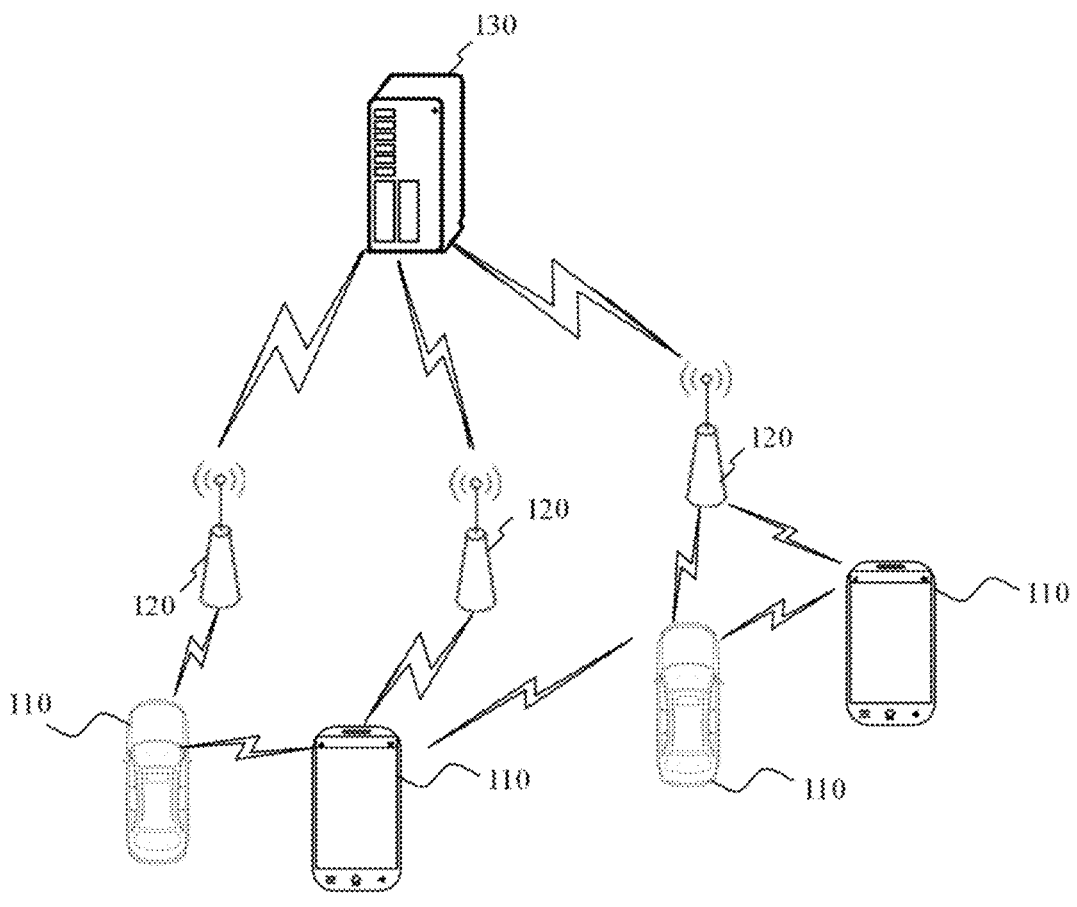

FIG. 1

| Network device | | | Terminal |
|---|---|---|---|

Step 21 Send, to the terminal, a feedback message for the terminal to initiate network registration; the feedback message carries capability indication information; and the capability indication information is used to indicate that a network supports performing remote subscription data delivery by means of a user plane and/or a control plane

FIG. 2

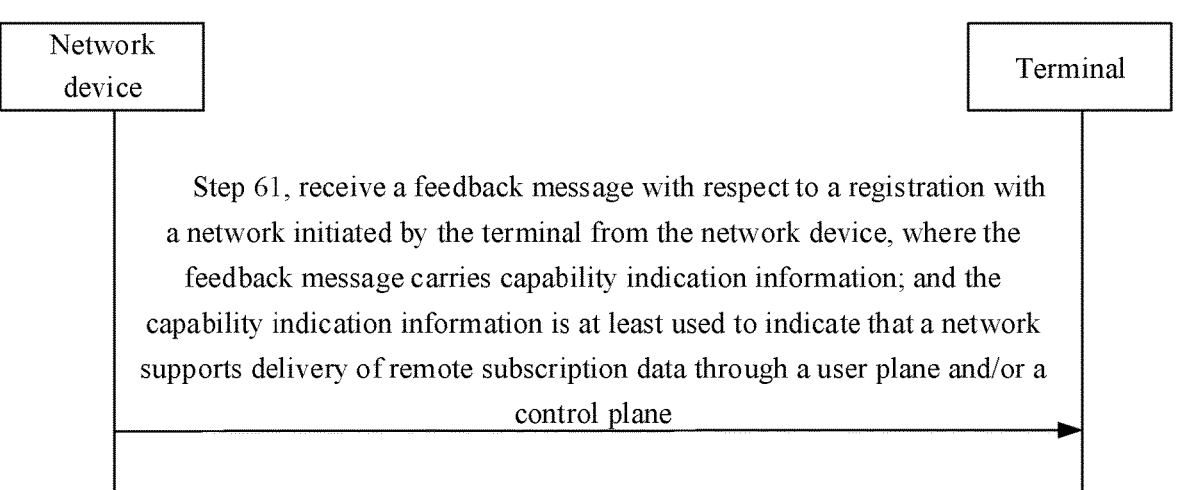

Step 61, receive a feedback message with respect to a registration with a network initiated by the terminal from the network device, where the feedback message carries capability indication information; and the capability indication information is at least used to indicate that a network supports delivery of remote subscription data through a user plane and/or a control plane

FIG. 6

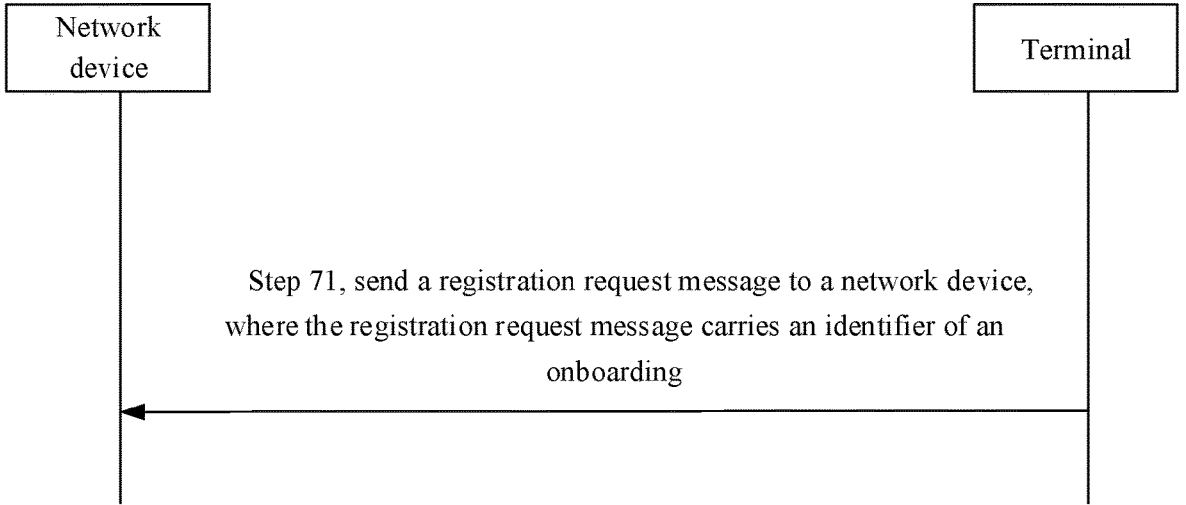

Step 71, send a registration request message to a network device, where the registration request message carries an identifier of an onboarding

FIG. 7

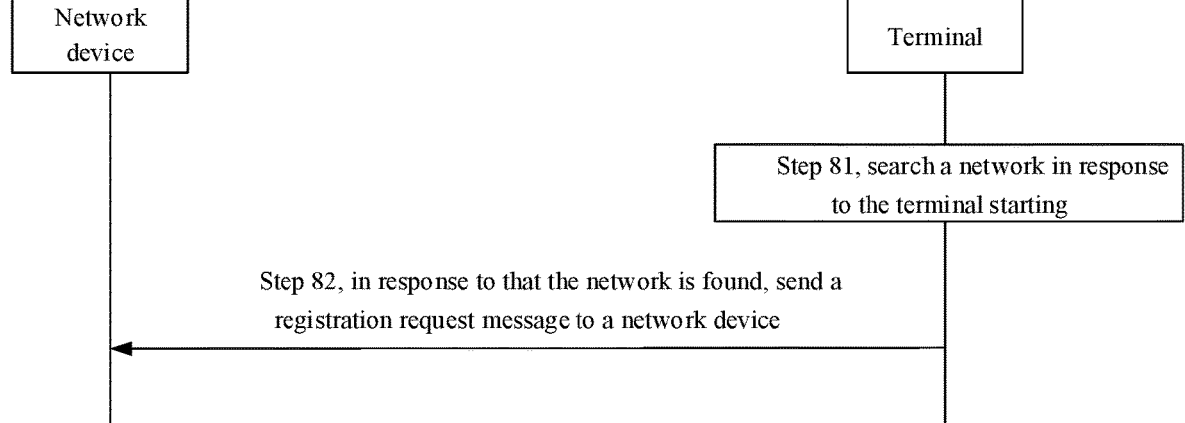

Step 81, search a network in response to the terminal starting

Step 82, in response to that the network is found, send a registration request message to a network device

FIG. 8

METHOD AND APPARATUS FOR TRANSMITTING CAPABILITY INDICATION INFORMATION, COMMUNICATION DEVICE, AND STORAGE MEDIUM

CROSS-REFERENCE TO RELATED APPLICATION

The application is a U.S. National Stage of International Application No. PCT/CN2021/092843 filed on May 10, 2021, the entire content of which is incorporated herein by reference for all purposes.

BACKGROUND

Standalone Non-public Network (SNPN) has become an important deployment scenario for commercial use of the fifth-generation mobile communication technology (5G, 5th-Generation), and can provide more professional and higher-quality service. For example, concert venues can provide more professional and higher-quality music or video services through SNPN. Public Land Mobile Network (PLMN) can provide common services, such as data and voice, by utilizing the characteristics of wide coverage. In this way, the user can reasonably select a network to obtain corresponding services according to needs, so as to improve user experience.

SUMMARY

The present disclosure relates to the technical field of wireless communication but is not limited to the technical field of wireless communication, and in particular, relates to a method and apparatus for transmitting capability indication information, a communication device and a storage medium.

According to a first aspect of the present disclosure, some embodiments provide a method for transmitting capability indication information, where the method is performed by a network device, and the method includes:

sending to a terminal a feedback message with respect to a registration with a network initiated by the terminal;

where the feedback message carries capability indication information, and the capability indication information is at least used to indicate that the network supports delivery of remote subscription data through a user plane and/or a control plane.

According to a second aspect of the present disclosure, some embodiments provide a method for transmitting capability indication information, where the method is performed by a terminal, and the method includes:

receiving a feedback message with respect to a registration with a network initiated by the terminal sent by a network device;

where the feedback message carries capability indication information, and the capability indication information is at least used to indicate that the network supports delivery of remote subscription data through a user plane and/or a control plane.

According to a third aspect of the present disclosure, some embodiments provide a communication device, and the communication device includes:

a processor;

a memory for storing executable instructions of the processor;

where the processor is configured to implement the method described in any embodiment of the present disclosure when running the executable instructions.

According to a fourth aspect of the present disclosure, some embodiments provide a computer storage medium, the computer storage medium stores a computer executable program, and when the executable program is executed by a processor, the method described in any embodiment of the present disclosure is implemented.

BRIEF DESCRIPTION OF THE DRAWINGS

FIG. 1 is a schematic structural diagram of a wireless communication system according to an exemplary embodiment of the present disclosure.

FIG. 2 is a schematic diagram showing a method for transmitting capability indication information according to an exemplary embodiment of the present disclosure.

FIG. 6 is a schematic flowchart of a method for transmitting capability indication information according to an exemplary embodiment of the present disclosure.

FIG. 7 is a schematic flowchart of a method for transmitting capability indication information according to an exemplary embodiment of the present disclosure.

FIG. 8 is a schematic flowchart of a method for transmitting capability indication information according to an exemplary embodiment of the present disclosure.

DETAILED DESCRIPTION

Figures 3, 4, 5:
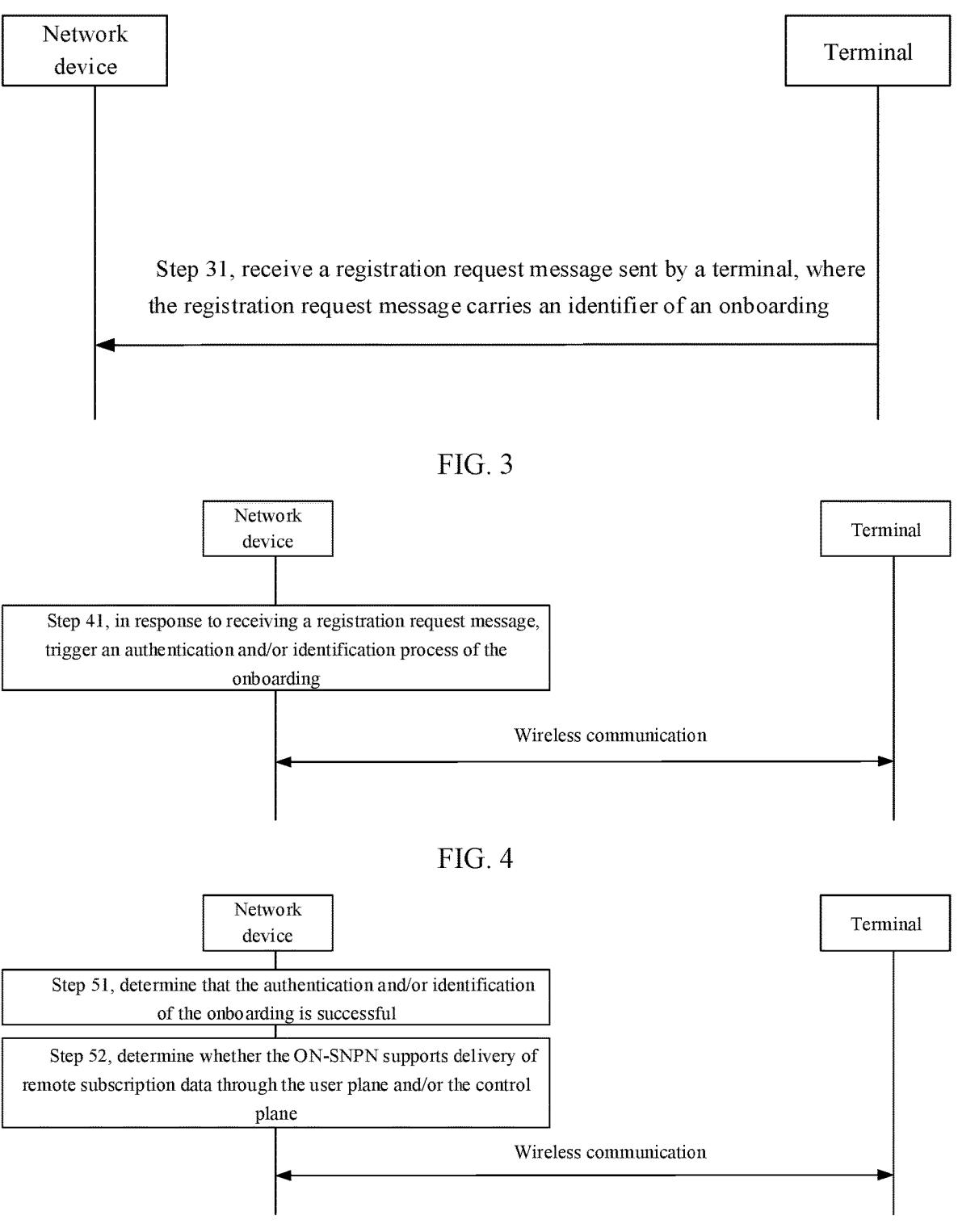
FIG. 3 is a schematic flowchart of a method for transmitting capability indication information according to an exemplary embodiment of the present disclosure.
FIG. 4 is a schematic flowchart of a method for transmitting capability indication information according to an exemplary embodiment of the present disclosure.
FIG. 5 is a schematic flowchart of a method for transmitting capability indication information according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present disclosure. Instead, they are merely examples of apparatuses and methods consistent with aspects related to the embodiments of the present disclosure.

The terms used in the embodiments of the present disclosure are for the purpose of describing particular embodiments only and are not intended to limit the embodiments of the present disclosure. As used in the embodiments of the present disclosure and the appended claims, the singular forms "a/an" and "the" are intended to include the plural forms as well, unless the context clearly dictates otherwise. It should also be understood that the term "and/or" as used herein refers to and includes any and all possible combinations of one or more of the associated listed items.

It should be understood that although the terms first, second, third, etc. may be used in the embodiments of the present disclosure to describe various pieces of information, such information should not be limited by these terms. These terms are only used to distinguish the same type of information from each other. For example, the first information may also be referred to as second information, and similarly, the second information may also be referred to as the first information, without departing from the scope of the embodiments of the present disclosure. Depending on the context, the word "if" as used herein can be interpreted as "at the time of" or "when" or "in response to determining".

For the purpose of brevity and ease of understanding, the term "greater than" or "less than" is used herein when characterizing a size relationship. However, those skilled in the art can understand that the term "greater than" also covers the meaning of "greater than or equal to", and "less than" also covers the meaning of "less than or equal to".

In related art, the subscription data of the PLMN user is stored in a Subscriber Identity Module (SIM). When a user buys a new phone, he/she needs to go to the operator to buy a SIM and insert it into the phone to use the data in the SIM card for network selection, registration and other processes. In SNPN, there is usually no SIM card, and the subscription data needs to be sent to the device through remote provisioning. This process will bring a lot of signaling overhead.

FIG. 1 shows a schematic structural diagram of a wireless communication system provided by an embodiment of the present disclosure. As shown in FIG. 1, the wireless communication system is a communication system based on mobile communication technology, and the wireless communication system may include: several user equipments 110 and several base stations 120.

The user equipment 110 may be a device that provides voice and/or data connectivity to the user. The user equipment 110 can communicate with one or more core networks via a radio access network (RAN), and the user equipment 110 may be an Internet of Things user equipment, such as a sensor device, a mobile phone, and a computer with an Internet of Things user equipment, for example, may be a fixed, portable, pocket, hand-held, computer built-in, or vehicle-mounted apparatus. For example, it may be a Station (STA), a subscriber unit, a subscriber station, a mobile station, a mobile, a remote station, an access point, a remote user equipment (remote terminal), an access user equipment (access terminal), a user terminal, a user agent, a user device, or a user equipment. Alternatively, the user equipment 110 may also be a device of an unmanned aerial vehicle. Alternatively, the user equipment 110 may also be a vehicle-mounted device, for example, a trip computer with a wireless communication function, or a wireless user device connected externally to the trip computer. Alternatively, the user equipment 110 may also be a roadside device, for example, may be a street lamp, a signal lamp, or other roadside devices with a wireless communication function.

The base station 120 may be a network side device in the wireless communication system. The wireless communication system may be a fourth generation mobile communication technology (the 4th generation mobile communication, 4G) system, also known as a Long Term Evolution (LTE) system; or, the wireless communication system may also be a 5G system, also known as a new air interface system or 5G NR system. Alternatively, the wireless communication system may also be a next-generation system of the 5G system. Among them, the access network in the 5G system can be called New Generation-Radio Access Network (NG-RAN).

The base station 120 may be an evolved base station (eNB) adopted in the 4G system. Alternatively, the base station 120 may also be a base station (gNB) adopting a centralized and distributed architecture in the 5G system. When the base station 120 adopts the centralized and distributed architecture, it generally includes a central unit (CU) and at least two distributed units (DUs). The central unit is provided with protocol stacks of a Packet Data Convergence Protocol (PDCP) layer, a Radio Link Control (RLC) layer, a Media Access Control (MAC) layer; and a Physical (PHY) layer protocol stack is set in the distributed unit. The embodiments of the present disclosure do not limit the specific implementation of the base station 120.

A wireless connection may be established between the base station 120 and the user equipment 110 through a wireless air interface. In different embodiments, the wireless air interface is a wireless air interface based on the fourth-generation mobile communication network technology (4G) standard; or, the wireless air interface is a wireless air interface based on the fifth-generation mobile communication network technology (5G) standard, for example, the wireless air interface is a new air interface; alternatively, the wireless air interface may also be a wireless air interface based on a technical standard of a next-generation mobile communication network based on 5G.

In some embodiments, an End to End (E2E) connection may also be established between the user equipments 110, such as vehicle to vehicle (V2V) communication, vehicle to Infrastructure (V2I) communication, vehicle to pedestrian (V2P) communication and other scenes in vehicle to everything (V2X) communication.

Here, the above user equipment may be regarded as the terminal device in the following embodiments.

In some embodiments, the foregoing wireless communication system may further include a network management device 130.

Several base stations 120 are connected to the network management device 130 respectively. The network management device 130 may be a core network device in the wireless communication system, for example, the network management device 130 may be a Mobility Management Entity (MME) in an Evolved Packet Core (EPC). Alternatively, the network management device may also be other core network devices, such as a Serving GateWay (SGW), a Public Data Network Gateway (PGW), a Policy and Charging Rules Function (PCRF) or a Home Subscriber Server (HSS), etc. The implementation form of the network management device 130 is not limited in the embodiments of the present disclosure.

The embodiments of the present disclosure list a plurality of implementation manners to clearly illustrate the technical solutions of the embodiments of the present disclosure. The plurality of embodiments provided by the embodiments of the present disclosure can be executed independently, or can be executed after combination with the method(s) of other embodiment(s) in the embodiments of the present disclosure, or can be executed together with some methods in other related art, or can be executed together with some methods in other related art after combination with the method(s) of other embodiment(s) in the embodiments of the present disclosure; which is not limited in the embodiments of the present disclosure.

In order to better understand the embodiments of the present disclosure, first, a scenario in which a terminal performs network registration is described.

In an embodiment, in the SNPN, it is necessary to use the parameter of remote provisioning to obtain subscription data for accessing the network. That is, before obtaining the subscription data, it is necessary to obtain the parameter of remote provisioning. It should be noted that the parameter of remote provisioning can be obtained only when both the terminal and the network support the capability of remote provisioning. Therefore, the terminal needs to determine in advance whether the SNPN supports the capability of remote provisioning. Here, the "provisioning" may refer to configuring.

As shown in FIG. 2, a method for transmitting capability indication information is provided in this embodiment, where the method is performed by a network device, and the method includes the following step.

In step 21, a feedback message with respect to a registration with a network initiated by a terminal is sent to the terminal.

The feedback message carries capability indication information; and the capability indication information is at least used to indicate that the network supports delivery of remote subscription data through a user plane and/or a control plane.

In some embodiments, the network device may be an Access and Mobility Management Function (AMF) or a Mobility Management Entity (MME), etc. In an embodiment, when the wireless communication system is the new air interface (NR) system, the network device may be the AMF. When the wireless communication system is a Universal Terrestrial Radio Access Network (E-UTRAN) system, the network device may be the MME. The AMF or MME may transmit data to the terminal through the base station. Here, the base station is an interface device for the terminal to access the network.

In some embodiments, the terminal may be, but not limited to, a mobile phone, a wearable device, a vehicle-mounted terminal, a Road Side Unit (RSU), a smart home terminal, an industrial sensor device or a medical device, etc.

In some embodiments, the base station may be various types of base stations, for example, a base station of the third-generation mobile communication (3G) network, a base station of the fourth-generation mobile communication (4G) network, a base station in the fifth-generation mobile communication (5G) network or other evolved base stations.

In an embodiment, the network where the network device is located is the SNPN. It should be noted that the terminal needs to obtain remote subscription data from the operator SO-SNPN after completing authentication and identification of the onboarding ON-SNPN, and the terminal can only access the network normally after obtaining the remote subscription data.

Here, the network supporting delivery of remote subscription data through the user plane and/or control plane may refer to supporting remote provisioning of the parameter for delivery of remote subscription data through the user plane and/or control plane.

In an embodiment, after successful authentication and/or successful identification of the onboarding, it is determined whether the SNPN supports remote provisioning of the parameter for delivering remote subscription data through the user plane and/or control plane. In an embodiment, the SNPN supports remote provisioning of the parameter for delivering remote subscription data through the user plane and/or the control plane. In another embodiment, the SNPN does not support remote provisioning of the parameter for delivering remote subscription data through the user plane and/or the control plane.

Here, the remote provisioning of the parameter for delivering remote subscription data may be performed through a traffic channel and/or a control channel.

In an embodiment, in the process of initiating registration with the network by the terminal, if the network registration is successful, the network device may send a feedback message to the terminal. Here, the feedback message may carry the capability indication information. Here, since the capability indication information is carried in the feedback message, signaling can be saved. In another embodiment, in the process of initiating registration with the network by the terminal, if the network registration fails, the network device will not send a feedback message to the terminal.

In an embodiment, after the terminal is powered on, it will search for an SNPN network that supports onboarding and provisioning service. After the terminal selects the SNPN network, it may send a registration request to the ON-SNPN. After the network device receives the registration request, it may trigger the onboarding authentication and identification process. After it is determined that the authentication and identification process is passed, a feedback message with respect to the registration with the network initiated by the terminal is sent to the terminal.

In an embodiment, the terminal needs to obtain the remote subscription data for accessing the network according to the parameter of the remote provisioning of the network. Therefore, before obtaining the remote subscription data of the network, it is necessary to obtain the parameter of the remote provisioning of the network. It should be noted that the prerequisite for obtaining the parameter of the remote provisioning of the network is that the network supports the remote provisioning of the parameter.

In an embodiment, the network may support remote provisioning of the parameter for delivering remote subscription data through the user plane and/or the control plane. In another embodiment, the network may not support remote provisioning of the parameter for delivering remote subscription data through the user plane and/or the control plane.

In an embodiment, when the network supports the remote provisioning, the manner to deliver the remote subscription data may be one of the following:

the first manner of delivering the remote subscription data through the user plane;

the second manner delivering the remote subscription data through the control plane;

the third manner of delivering the remote subscription data through the user plane and the control plane. Here, it should be noted that, when the third manner is adopted for delivery, the network may deliver the remote subscription data through the user plane or through the control plane.

In an embodiment, when the network supports delivery in the first manner, the indication information may carry a first identifier. Here, the first identifier is used to indicate that the network supports delivery of the remote subscription data through the user plane.

In an embodiment, when the network supports delivery in the second manner, the indication information may carry a second identifier. Here, the second identifier is used to indicate that the network supports delivery of the remote subscription data through the control plane.

In an embodiment, when the network supports delivery in a third manner, the indication information may carry a third identifier. Here, the third identifier is used to indicate that the network supports delivery of the remote subscription data through the user plane and the control plane.

In an embodiment, a new predetermined field may be added to the field corresponding to the feedback message. The predetermined field indicates the capability indication information. The predetermined field may indicate one of the first identifier, the second identifier and the third identifier.

Here, it should be noted that the network can perform remote provisioning of the parameter only when the delivery manner supported by the network is the same as that supported by the terminal. For example, when the network supports the first delivery manner and the terminal supports the first delivery manner, the network can deliver the remote subscription data by using the first manner. For another example, when the network only supports the first delivery manner and the terminal does not support the first delivery manner, the network cannot deliver the remote subscription data by using the first manner.

In an embodiment, the feedback message is a terminal registration accept message in the SNPN registration process.

In the embodiments of the present disclosure, a feedback message with respect to a registration with a network initiated by the terminal is sent to the terminal; where the feedback message carries capability indication information; and the capability indication information is used to indicate that the network supports delivery of the remote subscription data through the user plane and/or control plane. Here, the feedback message may carry capability indication information, and the capability indication information indicates that the network supports the delivery of the remote subscription data through the user plane and/or the control plane. Compared with the manner in which the terminal needs to actively report the capability information for delivering the remote subscription data of the terminal and the network device feeds back whether the network supports the capability indicated by the capability information, the present disclosure saves the process of reporting the capability information, thereby saving signaling overhead.

The methods provided in the embodiments of the present disclosure can be executed independently, or can be executed together with some methods in the embodiments of the present disclosure or some methods in the related art.

As shown in FIG. 3, a method for transmitting capability indication information is provided in this embodiment, where the method is performed by a network device, and the method includes the following step.

In step 31, a registration request message sent by a terminal is received, where the registration request message carries an identifier of an onboarding.

In an embodiment, after the terminal is powered on, it will search for a network that supports onboarding and provisioning service. After the terminal selects a network, it may send a registration request message to the network. After receiving the registration request message, the network device may trigger onboarding authentication and identification process. After it is determined that the authentication and identification process is passed, a feedback message with respect to the registration with the network initiated by the terminal is sent to the terminal. Here, it should be noted that if the authentication and identification process fails, no feedback message with respect to the registration with the network initiated by the terminal will be sent to the terminal.

In an embodiment, the network device receives the registration request message sent by the terminal; if it is determined that the registration request message carries the identifier of onboarding, the authentication and identification process of onboarding may be triggered. It should be noted that the registration request may include different types of registration requests. Here, the identifier of onboarding carried in the registration request message is used to indicate that the registration request is an onboarding type registration request. Here, different types of registration request messages carry different identifiers.

The methods provided in the embodiments of the present disclosure may be executed independently, or may be executed together with some methods in the embodiments of the present disclosure or some methods in the related art.

As shown in FIG. 4, a method for transmitting capability indication information is provided in this embodiment, where the method is performed by a network device, and the method includes the following step.

In step 41, in response to receiving a registration request message, an authentication and/or identification process of an onboarding is triggered.

Here, it should be noted that the network may have the onboarding authentication and identification processes at the same time, or may only have the onboarding authentication process or the authentication process.

In an embodiment, after the terminal is powered on, it will search for an SNPN network that supports onboarding and provisioning service. After the terminal selects the SNPN network, it may send a registration request message to the ON-SNPN. After receiving the registration request message, the network device may trigger authentication and identification process of onboarding. After it is determined that the authentication and identification process is passed, a feedback message with respect to the registration with the network initiated by the terminal is sent to the terminal. Here, it should be noted that if the authentication and identification process fails, no feedback message with respect to the registration with the network initiated by the terminal will be sent to the terminal.

In an embodiment, the network device receives the registration request message sent by the terminal; if it is determined that the registration request message carries the identifier of onboarding, the authentication and identification process of onboarding may be triggered. It should be noted that the registration request may include different types of registration requests. Here, the identifier of onboarding carried in the registration request message is used to indicate that the registration request is an onboarding type registration request. Here, different types of registration request messages carry different identifiers.

The methods provided in the embodiments of the present disclosure may be executed independently, or may be executed together with some methods in the embodiments of the present disclosure or some methods in the related art.

As shown in FIG. 5, a method for transmitting capability indication information is provided in this embodiment, where the method is performed by a network device, and the method includes the following steps.

In step 51, it is determined that the authentication and/or identification of the onboarding is successful.

In step 52, it is determined whether the ON-SNPN supports delivery of remote subscription data through the user plane and/or the control plane.

In an embodiment, after the terminal selects the SNPN network, it may send a registration request message to the ON-SNPN. After the network device receives the registration request, it may trigger the authentication and identification process of onboarding.

In an embodiment, if it is determined that the authentication and/or identification of the onboarding is unsuccessful, no feedback message with respect to the registration with the network initiated by the terminal is sent to the terminal. At this time, it is unnecessary to determine whether the ON-SNPN supports delivery of remote subscription data through the user plane and/or the control plane.

In an embodiment, if it is determined that the authentication and/or identification of the onboarding is successful, a feedback message with respect to the registration with the network initiated by the terminal needs to be sent to the terminal. At this point, it needs to be determined whether the ON-SNPN supports delivery of remote subscription data through the user plane and/or the control plane.

In an embodiment, if the ON-SNPN does not support the delivery of remote subscription data through the user plane and/or the control plane, it may also send a feedback message with respect to the registration with the network initiated by the terminal to the terminal.

The methods provided in the embodiments of the present disclosure may be executed independently, or may be executed together with some methods in the embodiments of the present disclosure or some methods in the related art.

In an embodiment, the indication information includes one of the following:

a first identifier, used to indicate that ON-SNPN supports delivery of remote subscription data through the user plane;

a second identifier, used to indicate that ON-SNPN supports delivery of remote subscription data through the control plane;

a third identifier, used to indicate that the ON-SNPN supports delivery of remote subscription data through the user plane and the control plane.

In an embodiment, when the network supports remote provisioning, the delivery manner may be one of the following:

a first manner for delivering remote subscription data through the user plane;

a second manner for delivering remote subscription data through the control plane;

a third manner for delivering remote subscription data through the user plane and the control plane. Here, it should be noted that, when the third manner is used for remote provisioning, the network may deliver the remote subscription data through the user plane or the control plane.

In an embodiment, when the network supports delivery in the first manner, the indication information may carry a first identifier. Here, the first identifier is used to indicate that the network supports delivery of remote subscription data through the user plane.

In an embodiment, when the network supports delivery in the second manner, the indication information may carry a second identifier. Here, the second identifier is used to indicate that the network supports delivery of remote subscription data through the control plane.

In an embodiment, when the network supports delivery in the third manner, the indication information may carry a third identifier. Here, the third identifier is used to indicate that the network supports delivery of remote subscription data through the user plane and the control plane.

In an embodiment, a new predetermined field may be added to the field corresponding to the feedback message. The predetermined field indicates capability indication information. The predetermined field may indicate one of the first identifier, the second identifier and the third identifier.

The methods provided in the embodiments of the present disclosure may be executed independently, or may be executed together with some methods in the embodiments of the present disclosure or some methods in the related art.

As shown in FIG. 6, a method for transmitting capability indication information is provided in this embodiment, where the method is performed by a terminal, and the method includes the following step.

In step 61, a feedback message with respect to a registration with a network initiated by the terminal is received from the network device.

The feedback message carries capability indication information; and the capability indication information is at least used to indicate that the network supports delivery of remote subscription data through a user plane and/or a control plane.

In some embodiments, the network device may be an Access and Mobility Management Function (AMF) or a Mobility Management Entity (MME), etc. In an embodiment, when the wireless communication system is a New Radio (NR) system, the network device may be the AMF; when the wireless communication system is a Universal Terrestrial Radio Access Network (E-UTRAN) system, the network device may be the MME. The AMF or MME may transmit data to the terminal through the base station. Here, the base station is an interface device for the terminal to access the network.

In some embodiments, the terminal may be, but not limited to, a mobile phone, a wearable device, a vehicle-mounted terminal, a Road Side Unit (RSU), a smart home terminal, an industrial sensor device or a medical device, etc.

In some embodiments, the base station may be various types of base stations, for example, a base station of the third-generation mobile communication (3G) network, a base station of the fourth-generation mobile communication (4G) network, a base station of the fifth-generation mobile communication (5G) network or other evolved base stations.

In an embodiment, the network where the network device is located is the SNPN. It should be noted that the terminal needs to obtain subscription data from the operator SO-SNPN after the onboarding ON-SNPN completes authentication and identification, and the terminal can normally access the network only after obtaining the subscription data.

Here, the network supporting delivery of remote subscription data through the user plane and/or control plane may refer to supporting the remote provisioning of the parameter for delivery of subscription data through the user plane and/or control plane.

In an embodiment, after the authentication of onboarding is successful and/or the identification of onboarding is successful, it is determined whether the SNPN supports remote provisioning of the parameter for delivery of subscription data through the user plane and/or control plane. In an embodiment, the SNPN supports the remote provisioning of the parameter for delivery of subscription data through the user plane and/or the control plane. In another embodiment, the SNPN does not support the remote provisioning of the parameter for delivery of subscription data through the user plane and/or the control plane.

Here, the remote provisioning of the parameter for delivery of the subscription data may be performed through the traffic channel and/or the control channel.

In an embodiment, when the terminal initiates registration with the network, if the network registration is successful, the network device may send a feedback message to the terminal. Here, the feedback message may carry the capability indication information. Here, since the capability indication information is carried in the feedback message, signaling can be saved. In another embodiment, in the process of initiating registration with the network by the terminal, if the network registration fails, the network device will not send a feedback message to the terminal.

In an embodiment, after the terminal is powered on, it may search for an SNPN network that supports onboarding and provisioning service. After the terminal selects the SNPN network, it may send a registration request to the ON-SNPN. After the network device receives the registration request, it may trigger the authentication and identification process of onboarding. After it is determined that the authentication and identification process is passed, a feedback message with respect to the registration with the network initiated by the terminal is sent to the terminal.

In an embodiment, the terminal needs to acquire the subscription data for accessing the network according to the parameter of remote provisioning of the network. Therefore, before obtaining the subscription data of the network, it is necessary to obtain the parameter of the remote provisioning of the network. It should be noted that the prerequisite for obtaining the parameter of remote provisioning of the network is that the network supports the remote provisioning of the parameter.

In an embodiment, the network may support remote provisioning of the parameter for delivery of subscription data through the user plane and/or the control plane. In another embodiment, the network may not support remote provisioning of the parameter for delivery of subscription data through the user plane and/or the control plane.

In an embodiment, when the network supports remote provisioning, the delivery manner may be one of the following:

a first manner of delivering remote subscription data through the user plane;

a second manner of delivering remote subscription data through the control plane;

a third manner of delivering remote subscription data through the user plane and the control plane. Here, it should be noted that, when the third manner is used for delivery, the network may deliver the remote subscription data through the user plane or the control plane.

In an embodiment, when the network supports delivery in the first manner, the indication information may carry a first identifier. Here, the first identifier is used to indicate that the network supports delivery of remote subscription data through the user plane.

In an embodiment, when the network supports delivery in the second manner, the indication information may carry a second identifier. Here, the second identifier is used to indicate that the network supports delivery of remote subscription data through the control plane.

In an embodiment, when the network supports delivery in the third manner, the indication information may carry a third identifier. Here, the third identifier is used to indicate that the network supports delivery of remote subscription data through the user plane and the control plane.

In an embodiment, a new predetermined field may be added to the field corresponding to the feedback message. The predetermined field indicates the capability indication information. The predetermined field may indicate one of the first identifier, the second identifier and the third identifier.

Here, it should be noted that only when the delivery manner supported by the network is the same as that supported by the terminal, the network can deliver the remote subscription data. For example, when the network supports the first delivery manner and the terminal supports the first delivery manner, the network can deliver the remote subscription data by using the first manner. For another example, when the network only supports the first delivery manner and the terminal does not support the first delivery manner, the network cannot deliver remote subscription data by using the first manner.

In an embodiment, the feedback message is a terminal registration accept message in the SNPN registration process.

The methods provided in the embodiments of the present disclosure may be executed independently, or may be executed together with some methods in the embodiments of the present disclosure or some methods in the related art.

As shown in FIG. 7, a method for transmitting capability indication information is provided in this embodiment, where the method is performed by a terminal, and the method includes the following step.

In step 71, a registration request message is sent to a network device, where the registration request message carries an identifier of an onboarding.

In an embodiment, after the terminal is powered on, it will search for a network that supports onboarding and provisioning service. After the terminal selects a network, it may send a registration request message to the network. After receiving the registration request message, the network device may trigger authentication and identification process of onboarding. After it is determined that the authentication and identification process is passed, a feedback message with respect to the registration with the network initiated by the terminal is sent to the terminal. Here, it should be noted that if the authentication and identification process fails, no feedback message with respect to the registration with the network initiated by the terminal will be sent to the terminal.

In an embodiment, the network device receives the registration request message sent by the terminal; if it is determined that the registration request message carries the identifier of onboarding, the authentication and identification process of onboarding may be triggered. It should be noted that the registration request may include different types of registration requests. Here, the identifier of onboarding carried in the registration request message is used to indicate that the registration request is an onboarding type registration request. Here, different types of registration request messages carry different identifiers.

The methods provided in the embodiments of the present disclosure may be executed independently, or may be executed together with some methods in the embodiments of the present disclosure or some methods in the related art.

As shown in FIG. 8, a method for transmitting capability indication information is provided in this embodiment, where the method is performed by a terminal, and the method includes the following steps.

In step 81, a network is searched in response to the terminal starting.

In step 82, in response to that the network is found, a registration request message is sent to a network device.

In an embodiment, after the terminal is powered on, it will search for a network that supports onboarding and provisioning service. After the terminal selects a network, it may send a registration request message to the network. After receiving the registration request message, the network device may trigger authentication and identification process of onboarding. After it is determined that the authentication and identification process is passed, a feedback message with respect to the registration with the network initiated by the terminal is sent to the terminal. Here, it should be noted that if the authentication and identification process fails, no feedback message with respect to the registration with the network initiated by the terminal will be sent to the terminal.

In an embodiment, after the terminal selects the SNPN network, it may send a registration request message to the ON-SNPN. After the network device receives the registration request, it may trigger the authentication and identification process of onboarding.

In an embodiment, if it is determined that the authentication and/or identification of the onboarding is unsuccessful, no feedback message with respect to the registration with the network initiated by the terminal is sent to the terminal. At this time, it is unnecessary to determine whether the ON-SNPN supports delivery of remote subscription data through the user plane and/or the control plane.

In an embodiment, if it is determined that the authentication and/or identification of the onboarding is successful, a feedback message with respect to the registration with the network initiated by the terminal needs to be sent to the terminal. At this point, it needs to be determined whether the ON-SNPN supports delivery of remote subscription data through the user plane and/or the control plane.

In an embodiment, if the ON-SNPN does not support the delivery of remote subscription data through the user plane and/or the control plane, it may also send a feedback message with respect to the registration with the network initiated by the terminal to the terminal.

The methods provided in the embodiments of the present disclosure may be executed independently, or may be executed together with some methods in the embodiments of the present disclosure or some methods in the related art.

Figures 9, 10, 11:
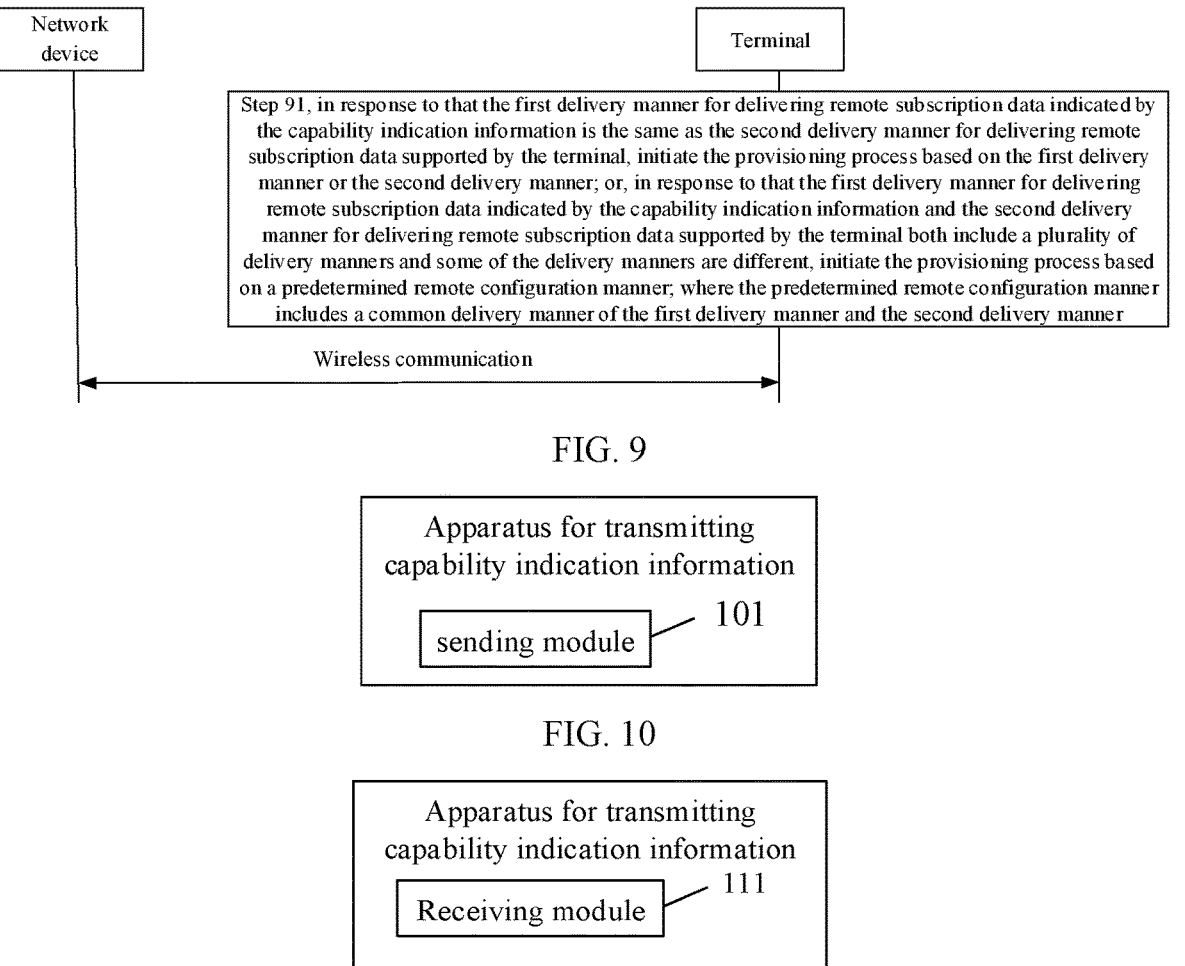
FIG. 9 is a schematic flowchart of a method for transmitting capability indication information according to an exemplary embodiment of the present disclosure.
FIG. 10 is a schematic diagram of an apparatus for transmitting capability indication information according to an exemplary embodiment of the present disclosure.
FIG. 11 is a schematic diagram of an apparatus for transmitting capability indication information according to an exemplary embodiment of the present disclosure.

As shown in FIG. 9, a method for transmitting capability indication information is provided in this embodiment, where the method is performed by a terminal, and the method includes the following step.

In step 91, in response to that the first delivery manner for delivering remote subscription data indicated by the capability indication information is the same as the second delivery manner for delivering remote subscription data supported by the terminal, the provisioning process is initiated based on the first delivery manner or the second delivery manner;

or, in response to that the first delivery manner for delivering remote subscription data indicated by the capability indication information and the second delivery manner for delivering remote subscription data supported by the terminal both include a plurality of delivery manners and some of the delivery manners are different, the provisioning process is initiated based on a predetermined remote provisioning manner; where the predetermined remote provisioning manner includes a common delivery manner of the first delivery manner and the second delivery manner.

In an embodiment, when the network supports remote provisioning, the delivery manner may be one of the following:

a first manner of delivering remote subscription data through the user plane;

a second manner of delivering remote subscription data through the control plane;

a third manner of delivering remote subscription data through the user plane and the control plane. Here, it should be noted that, when the third manner is used for remote provisioning, the network may deliver the remote subscription data through the user plane or the control plane.

Here, the first delivery manner may be any one or more of the first manner, the second manner, and the third manner. The second delivery manner may also be any one or more of the first manner, the second manner, and the third manner. When the first delivery manner is one manner and the second delivery manner is one manner, and the first delivery manner is different from the second delivery manner, delivery of remote subscription data cannot be performed. When there are a plurality of the first delivery manners and a plurality of the second delivery manners, and the plurality of first delivery manners and the plurality of second delivery manners have the same delivery manner(s), then the remote subscription data can be delivered by using the same delivery manner.

In an embodiment, the predetermined delivery manner includes the same delivery manner. When there are a plurality of the same delivery manners, the provisioning process may be initiated based on any one of the predetermined delivery manners.

The methods provided in the embodiments of the present disclosure may be executed independently, or may be executed together with some methods in the embodiments of the present disclosure or some methods in the related art.

In order to better understand the embodiments of the present disclosure, an exemplary embodiment is used below to further describe the embodiments of the present disclosure. This embodiment provides a method for transmitting capability indication information, and the method includes the following steps.

In step a1, UE is powered on and searches for an ON-SNPN network that supports onboarding and provisioning service.

In step a2, after selecting a network, the UE sends a registration request message to the ON-SNPN, where the registration request message carries an identifier indicating onboarding.

In step a3, after the network device AMF obtains the registration request message, it triggers authentication and identification process of the onboarding.

In step a4, after the authentication and identification process is passed, the network determines whether the ON-SNPN supports delivery of remote subscription data through a user plane and/or a control plane.

In step a5, AMF feeds back a UE registration accept message, the UE registration accept message carries an identifier of the remote provisioning manner supported by the network, for example, an identifier supporting the remote provisioning of the parameter for delivery of the subscription data through the user plane and/or control plane.

In step a6, after receiving a registration success message, according to the remote provisioning manner supported by the UE and the provisioning manner supported by the network, the UE initiates the provisioning process by selecting the manner supported by both the UE and the network. If both the UE and the network support two manners, which manner to use is determined by a predetermined method.

The methods provided in the embodiments of the present disclosure may be executed independently, or may be executed together with some methods in the embodiments of the present disclosure or some methods in the related art.

As shown in FIG. 10, this embodiment provides an apparatus for transmitting capability indication information, and the apparatus includes:

a sending module 101, configured to send a feedback message with respect to a registration with a network initiated by a terminal to the terminal;

where the feedback message carries capability indication information; the capability indication information is at least used to indicate that the network supports delivery of remote subscription data through a user plane and/or a control plane.

The methods provided in the embodiments of the present disclosure may be executed independently, or may be executed together with some methods in the embodiments of the present disclosure or some methods in the related art.

As shown in FIG. 11, this embodiment provides an apparatus for transmitting capability indication information, and the apparatus includes:

a receiving module 111, configured to receive a feedback message with respect to a registration with a network initiated by the terminal sent by a network device;

where the feedback message carries capability indication information; the capability indication information is at least used to indicate that the network supports delivery of remote subscription data through a user plane and/or a control plane.

The methods provided in the embodiments of the present disclosure may be executed independently, or may be executed together with some methods in the embodiments of the present disclosure or some methods in the related art.

An embodiment of the present disclosure provides a communication device, which includes:

a processor;

a memory for storing executable instructions of the processor;

where the processor is configured to implement the method applied to any embodiment of the present disclosure when executing the executable instructions.

The processor may include various types of storage media, which are non-transitory computer storage media, and can continue to memorize and store information thereon after the communication device is powered off.

The processor may be connected to the memory through a bus or the like, and is used to read the executable program stored in the memory.

An embodiment of the present disclosure further provides a computer storage medium, where the computer storage medium stores an executable program of a computer, and when the executable program is executed by the processor, the method of any embodiment of the present disclosure is implemented.

For the apparatuses in the foregoing embodiments, the specific manner in which each module executes operations has been described in detail in the embodiments related to the method, and will not be described in detail here.

Figure 12:
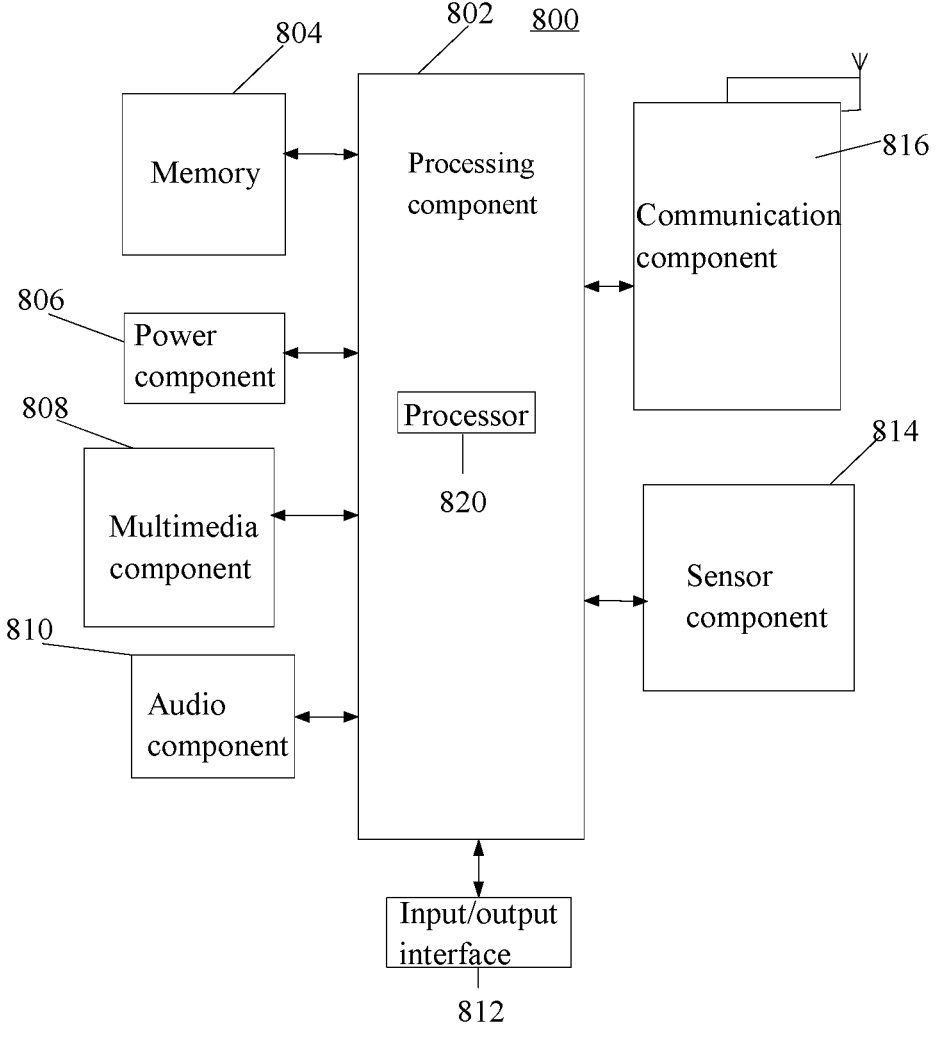
FIG. 12 is a schematic structural diagram of a terminal according to an exemplary embodiment of the present disclosure.

As shown in FIG. 12, an embodiment of the present disclosure provides a structure of a terminal.

Referring to the terminal 800 shown in FIG. 12, this embodiment provides a terminal 800, which specifically may be a mobile phone, a computer, a digital broadcast terminal, a messaging device, a gaming console, a tablet, a medical device, exercise equipment, a personal digital assistant, and the like Referring to FIG. 12, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

Figure 13:
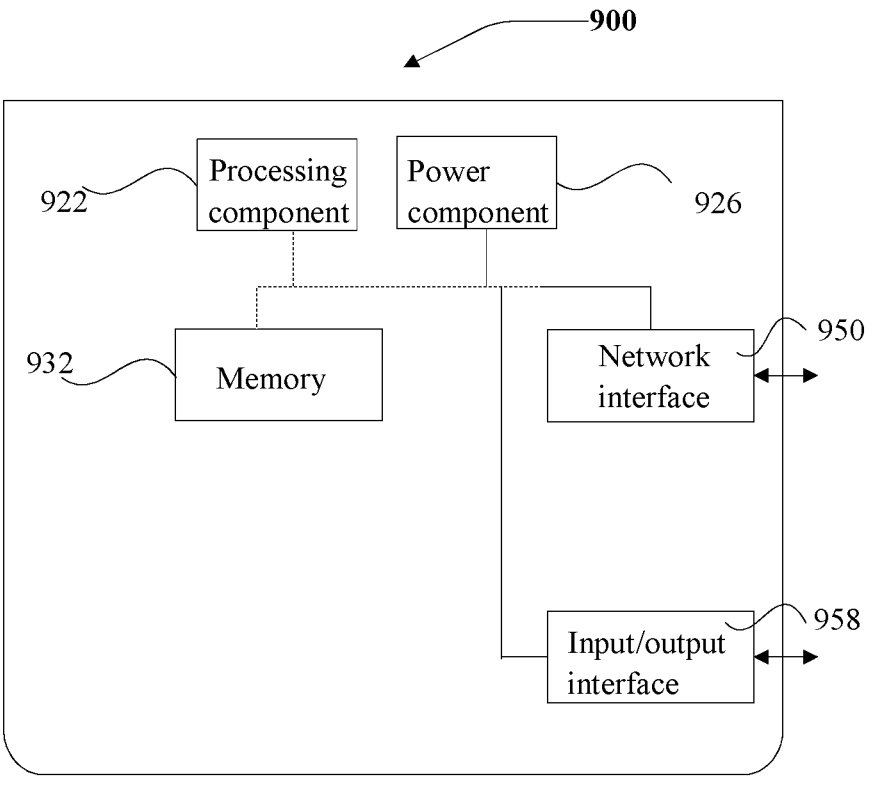
FIG. 13 is a block diagram of a base station according to an exemplary embodiment of the present disclosure.

FIG. 13 is a block diagram of a base station according to an exemplary embodiment of the present disclosure. For example, the base station 900 may be provided as a network side device. Referring to FIG. 13, the base station 900 includes a processing component 922 that further includes one or more processors, and memory resources represented by a memory 932 for storing instructions executable by the processing component 922, such as application programs. The application programs stored in the memory 932 may include one or more modules each corresponding to a set of instructions. Further, the processing component 922 is configured to execute the instructions to perform the above described method applied to the base station.

The base station 900 may also include a power component 926 configured to perform power management of the base station 900, wired or wireless network interface(s) 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™, or the like.

The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only.

It will be appreciated that the present disclosure is not limited to the exact construction that has been described above and illustrated in the accompanying drawings, and that various modifications and changes may be made without departing from the scope thereof.

What is claimed is:

1. A method for transmitting capability indication information, comprising:

sending, by a network device, to a terminal a feedback message with respect to a registration with a network initiated by the terminal;

wherein the feedback message is configured to carry capability indication information, and the capability indication information is at least configured to indicate that the network supports delivery of remote subscription data through at least one of a user plane or a control plane;

wherein the network is an onboarding standalone non-public network (ON-SNPN);

wherein the capability indication information comprises any one of:

a first identifier configured to indicate that the ON-SNPN supports the delivery of the remote subscription data through the user plane;

a second identifier configured to indicate that the ON-SNPN supports the delivery of the remote subscription data through the control plane; or a third identifier configured to indicate that the ON-SNPN supports the delivery of the remote subscription data through the user plane and the control plane.

2. The method according to claim 1, wherein the feedback message comprises a registration accept message.

3. The method according to claim 1, further comprising:

before sending to the terminal the feedback message, receiving, by the network device, a registration request message sent by the terminal, wherein the registration request message carries an identifier of an onboarding.

4. The method according to claim 3, further comprising:

in response to receiving the registration request message, triggering, by the network device, at least one of an authentication or identification process of the onboarding.

5. The method according to claim 3, further comprising:

determining, by the network device, at least one of successful authentication or successful identification of the onboarding;

determining, by the network device, whether an ON-SNPN supports the delivery of the remote subscription data through at least one of the user plane or the control plane.

6. A method for transmitting capability indication information, comprising:

receiving, by a terminal, a feedback message with respect to a registration with a network initiated by the terminal sent by a network device;

wherein the feedback message is configured to carry capability indication information, and the capability indication information is at least configured to indicate that the network supports delivery of remote subscription data through at least one of a user plane or a control plane;

wherein the network is an onboarding standalone non-public network (ON-SNPN);

wherein the capability indication information comprises any one of:

a first identifier configured to indicate that the ON-SNPN supports the delivery of the remote subscription data through the user plane;

a second identifier configured to indicate that the ON-SNPN supports the delivery of the remote subscription data through the control plane; or a third identifier configured to indicate that the ON-SNPN supports the delivery of the remote subscription data through the user plane and the control plane.

7. The method according to claim 6, wherein the feedback message comprises a registration accept message.

8. The method according to claim 6, further comprising:

before receiving the feedback message with respect to the registration with the network initiated by the terminal sent by the network device, sending, by the terminal, a registration request message to the network device, wherein the registration request message carries an identifier of an onboarding.

9. The method according to claim 8, further comprising:

in response to the terminal starting, searching, by the terminal, the network;

wherein sending the registration request message to the network device comprises:

in response to finding the network, sending the registration request message to the network device.

10. The method according to claim 6, further comprising:

in response to that a first delivery manner for delivering the remote subscription data indicated by the capability indication information is the same as a second delivery manner for delivering the remote subscription data supported by the terminal, initiating a provisioning process based on the first delivery manner or the second delivery manner;

or, in response to that the first delivery manner for delivering the remote subscription data indicated by the capability indication information and the second delivery manner for delivering the remote subscription data supported by the terminal comprise a plurality of delivery manners and some delivery manners are different, initiating the provisioning process based on a predetermined delivery manner; wherein the predetermined delivery manner comprises a delivery manner shared by the first delivery manner and the second delivery manner.

11. An apparatus for transmitting capability indication information, wherein the apparatus comprises:

a processor;

a memory for storing executable instructions of the processor;

wherein the processor is configured to implement the method for transmitting capability indication information according to claim 8.

12. An apparatus for transmitting capability indication information, wherein the apparatus comprises:

a processor;

a memory for storing executable instructions of the processor;

wherein the processor is configured to: send to a terminal a feedback message with respect to a registration with a network initiated by the terminal;

wherein the feedback message is configured to carry capability indication information, and the capability indication information is at least configured to indicate that the network supports delivery of remote subscription data through at least one of a user plane or a control plane;

wherein the network is an onboarding standalone non-public network (ON-SNPN);

wherein the capability indication information comprises any one of:

a first identifier configured to indicate that the ON-SNPN supports the delivery of the remote subscription data through the user plane;

a second identifier configured to indicate that the ON-SNPN supports the delivery of the remote subscription data through the control plane; or a third identifier configured to indicate that the ON-SNPN supports the delivery of the remote subscription data through the user plane and the control plane.

13. The apparatus according to claim 12, wherein the feedback message comprises a registration accept message.

14. The apparatus according to claim 12, wherein the processor is further configured to:

receive a registration request message sent by the terminal, wherein the registration request message carries an identifier of an onboarding.

15. The apparatus according to claim 14, wherein the processor is further configured to:

in response to receiving the registration request message, trigger at least one of an authentication or identification process of the onboarding.

16. The apparatus according to claim 14, wherein the processor is further configured to:

determine at least one of successful authentication or successful identification of the onboarding; and determine whether an ON-SNPN supports the delivery of the remote subscription data through at least one of the user plane or the control plane.

\* \* \* \* \*